United States Patent
Behravan et al.

(10) Patent No.: US 10,070,375 B2
(45) Date of Patent: Sep. 4, 2018

(54) ADAPTING THE NUMBER OF CELLS TO MEASURE IN A NETWORK WITH ON/OFF CELLS

(71) Applicant: Telefonaktiebolaget L M Ericsson (publ), Stockholm (SE)

(72) Inventors: Ali Behravan, Stockholm (SE); Muhammad Kazmi, Bromma (SE); Imadur Rahman, Sollentuna (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 14/773,893

(22) PCT Filed: Apr. 27, 2015

(86) PCT No.: PCT/SE2015/050466
§ 371 (c)(1),
(2) Date: Feb. 11, 2016

(87) PCT Pub. No.: WO2016/022051
PCT Pub. Date: Feb. 11, 2016

(65) Prior Publication Data
US 2016/0205574 A1  Jul. 14, 2016

Related U.S. Application Data

(60) Provisional application No. 62/035,051, filed on Aug. 8, 2014.

(51) Int. Cl.
*H04W 48/16* (2009.01)
*H04W 36/00* (2009.01)
*H04W 24/10* (2009.01)

(52) U.S. Cl.
CPC ....... *H04W 48/16* (2013.01); *H04W 36/0088* (2013.01); *H04W 24/10* (2013.01)

(58) Field of Classification Search
CPC .................................................... H04W 24/10
See application file for complete search history.

(56) References Cited

U.S. PATENT DOCUMENTS

2013/0235738 A1  9/2013  Siomina et al.
2014/0198680 A1  7/2014  Siomina et al.
(Continued)

FOREIGN PATENT DOCUMENTS

WO     2014109561 A1     7/2014

OTHER PUBLICATIONS

3GPP, "3rd Generation Partnership Project; Technical Specification Group Radio Access Network; Small cell enhancements for E-UTRA and E-UTRAN—Physical layer aspects (Release 12)", 3GPP TR 36.872 V12.0.0, Sep. 2013, pp. 1-78.
(Continued)

*Primary Examiner* — Brandon M Renner
(74) *Attorney, Agent, or Firm* — Murphy, Bilak & Homiller, PLLC

(57) ABSTRACT

In certain embodiments, a wireless device adapts a minimum number of a first type of cells, Min_type_1, and a minimum number of a second type of cells, Min_type_2, for which the wireless device is to perform radio measurements during an at least partly overlapping measurement time, T0, wherein the first type of cell transmits at least one type of reference signal in every subframe of the first type of cell over T0 and the second type of cell does not transmit any type of reference signal in at least one subframe of the second type of cell over T0. The wireless device performs the radio measurements on radio signals from at least Min_type_1 of the first type of cells and at least Min_type_2 of the second type of cells during T0 and uses the radio measurements for one or more radio tasks.

46 Claims, 6 Drawing Sheets

---

402 — Adapt, based on one or more pre-defined rules or criteria, a minimum number of a first type of cells, Min_type_1, and a minimum number of a second type of cells, Min_type_2, for which the wireless device is to perform radio measurements during an at least partly overlapping measurement time, T0.

- The first type of cell transmits at least one type of reference signal in every subframe of the first type of cell over T0.

- The second type of cell does not transmit any type of reference signal in at least one subframe of the second type of cell over T0.

404 — Perform the radio measurements on radio signals from at least Min_type_1 of the first type of cells and at least Min_type_2 of the second type of cells during T0.

406 — Use the radio measurements for one or more radio tasks.

(56) References Cited

U.S. PATENT DOCUMENTS

| | | | |
|---|---|---|---|
| 2014/0200016 A1 | 7/2014 | Siomina et al. | |
| 2015/0223245 A1* | 8/2015 | Cheng | H04W 48/16 |
| | | | 370/329 |
| 2016/0081107 A1* | 3/2016 | Yang | H04L 5/001 |
| | | | 370/280 |
| 2016/0360529 A1* | 12/2016 | Lee | H04L 5/0048 |
| 2017/0223667 A1* | 8/2017 | Yi | H04W 72/04 |
| | | | 370/329 |

OTHER PUBLICATIONS

3GPP, "3rd Generation Partnership Project; Technical Specification Group Radio Access Network; Small cell enhancements for E-UTRA and E-UTRAN—Physical layer aspects (Release 12)", 3GPP TR 36.872 V12.1.0, Dec. 2013, pp. 1-100.

\* cited by examiner

ADAPTING THE NUMBER OF CELLS TO MEASURE IN A NETWORK WITH ON/OFF CELLS

TECHNICAL FIELD

Particular embodiments are directed to wireless communications and, more particularly, to a device, a network node and methods therein for adapting the number of cells to measure in a network with on/off cells.

BACKGROUND

FIG. 1 illustrates an example of a wireless communications network that includes one or more wireless devices 110 (which may interchangeably be referred to as user equipment, UEs) and one or more network nodes, such as wireless network nodes 120 (e.g., a base station or an evolved Node B, eNB) and core network nodes 130. Wireless network nodes 120 can be associated with various types of cells, such as legacy cell 120a (e.g., a cell configured to transmit at least one type of reference signal in each subframe over a time period, T0) and on/off cell 120b (e.g., a cell that does not transmit any type of reference signal in at least one subframe over the time period, T0). In general, wireless devices 110 within coverage of a wireless network node 120 communicate with the wireless network node 120 over a wireless interface. For example, wireless devices 110 and wireless network nodes 120 may communicate wireless signals containing voice traffic, data traffic, and control signals. Core network node 130 manages the establishment of communication sessions and various other functionality for wireless device 110. The network nodes connect through interconnecting network 125, which refers to any interconnecting system capable of transmitting audio, video, signals, data, messages, or any combination of the preceding.

Small Cell on/Off

In densely deployed small cells, it is necessary to ensure low interference between cells for ensuring efficient operation. One of the mechanisms for interference avoidance and coordination among small cells is small cell on/off feature. According to this feature the small cell may be turned on and off where the "on" and "off" period may depend on the criteria or application.

In semi-static small cell on/off, the criteria for cell on/off can be traffic load, UE arrival/departure, etc. On the other hand, in dynamic small cell on/off, the small cell can be turned on and off on radio frame level or even subframe level. The criteria in this case can be packet arrival/completion or interference coordination and avoidance (i.e. reduce interference towards other nodes or UEs). So this means that the cell turns off at the subframe boundary (or end of current subframe) when the transmission of packet is completed and turns on at the next subframe boundary when a new packet arrives.

Another purpose of small cell on/off can be for energy saving. Some preliminary evaluation of the energy saving impact of the small cell on/off is presented in 3GPP TR 36.872, ver. 12.0.0, "Small cell enhancements for E-UTRA and E-UTRAN; Physical layer aspects." Some discussion of physical layer aspects of small cell enhancements is presented in 3GPP RP-132073.

There are different operational modes of small cell on/off
  Handover: In this mode a UE in CONNECTED mode is always attached to a cell. Due to increased traffic demand, for example, the network may decide to offload the UE by handover to a small cell. The small cell can be "off" and can wake up to serve the UE. The handover time in this case depends on the backhaul delay and the handover execution time. After completion of the transmission and/or reception of data, the UE goes to IDLE mode or is handed over to another cell and the small cell can be turned off again.
  SCell only: In this mode a carrier aggregation (CA) capable UE is connected to a primary cell (PCell), and the network configures a secondary cell (SCell) that can be turned on or off. If the network decides to offload the UE traffic to SCell, then the SCell is turned on.
  Dual connectivity: In this mode the UE is connected to two network nodes (or two or more cells from different network nodes), and one of the nodes (or one or more of the cells) can be turned on and off.
  Serving cell: In this mode a cell can be either on or off when a UE is connected to it. Certain procedures for radio resource management (RRM), radio link monitoring (RLM), and channel state information (CSI) measurements must be designed for this case.

Discovery Signal

In small cell on/off where the enhanced node B (eNB) can be off for a long period of time, a discovery signal might be needed in order to assist the UE with the measurements. This is referred to as Discovery Reference Signal (DRS) in some cases. The discovery signal needs to support the properties for enabling RRM measurements, RLM related procedures, and coarse time/frequency synchronization. In order to make the measurements possible, the eNB has to wake up periodically (e.g. once every 40 ms, 80 ms, or 160 ms, etc.) and send the discovery signal so that it can be used by the UE for mobility related operations such as cell identification, RLM, and measurement.

Since the discovery signal is rather sparse in time, it is desirable that the UE is able to make a meaningful measurement in one instance of the discovery signal rather than having to wait for multiple instances which may occur tens or hundreds of milliseconds apart. In addition to that, in order to make the measurement based on fewer samples in time more reliable, the discovery signal may need to be sent on wide bandwidth (e.g. the whole bandwidth).

It has been agreed in 3GPP that UE assumes primary synchronization signal (PSS)/secondary synchronization signal (SSS)/cell-specific reference signal (CRS) in the discovery reference signal (DRS). (See 3GPP TR 36.872, ver. 12.0.0, "Small cell enhancements for E-UTRA and E-UTRAN; Physical layer aspects."). Additionally Channel State Information-Reference Signals (CSI-RS) is assumed in the DRS for measurement if configured by higher layers. Both CRS-based reference signal received power (RSRP) measurements and CSI-RS-based RSRP measurements are supported. UE may report DRS-based RSRP/RSRQ (reference signal received quality) and associated physical cell identity (PCID) and information for TP identification.

Furthermore, for DRS-based measurement, a UE assumes that a DRS occasion for a cell consists of
  One instance of PSS/SSS per Rel-8
  CRS is transmitted at least in the same subframe(s) as PSS/SSS
  A DRS occasion can comprise multiple CSI-RS RE configurations. The different CSI-RS configurations may be in the same or different subframe(s)
  A DRS occasion for a cell comprises of N consecutive subframes (N<=5), and DRS occasion for a cell occurs every M ms (candidate values for M so far are 40, 80, 160 ms).

Examples of Radio Measurements

Several radio-related measurements are used by the UE or the radio network node to establish and keep the connection, as well as ensuring the quality of a radio link.

The measurements are used in radio resource control (RRC) idle state operations such as cell selection, cell reselection (e.g. between E-UTRANs, between different radio access technologies (RATs), and to non-3GPP RATs), and minimization of drive test (MDT), and also in RRC connected state operations such as for cell change (e.g. handover between E-UTRANs, handover between different RATs, and handover to non-3GPP RATs).

The UE has to first detect a cell and therefore cell identification, e.g. acquisition of a physical cell identity (PCI), is also a signal measurement. The UE may also have to acquire the cell global ID (CGI) of a node (or cell).

The RSRP and RSRQ are used for at least RRM measurements such as for mobility, which include mobility in RRC connected state as well as in RRC idle state. The RSRP and RSRQ are also used for other purposes, e.g. for enhanced cell ID positioning, minimization of drive test etc.

In RRC connected state the UE can perform intra-frequency measurements without measurement gaps. However as a general rule the UE performs inter-frequency and inter-RAT measurements in measurement gaps unless it is capable of performing them without gaps. To enable inter-frequency and inter-RAT measurements for the UE requiring gaps, the network has to configure the measurement gaps. Two periodic measurement gap patterns both with a measurement gap length of 6 ms are defined for LTE:

Measurement gap pattern #0 with repetition period 40 ms
  Measurement gap pattern #1 with repetition period 80 ms The measurements performed by the UE are then reported to the network, which may use them for various tasks.

The radio network node (e.g., base station) may also perform signal measurements. Examples of radio network node measurements in LTE are propagation delay between UE and itself, uplink signal-to-interference-plus-noise ratio (UL SINR), uplink signal-to-noise ratio (UL SNR), uplink signal strength, Received Interference Power (RIP), etc. The eNB may also perform positioning measurements which are described in a later section.

The UE also performs measurements on the serving cell (aka primary cell) in order to monitor the serving cell performance. This is called as radio link monitoring (RLM) or RLM related measurements in LTE. For RLM the UE monitors the downlink link quality based on the cell-specific reference signal in order to detect the downlink radio link quality of the serving or PCell.

In order to detect out-of-sync and in-sync, the UE compares the estimated quality with the thresholds Qout and Qin respectively. The threshold Qout and Qin are defined as the level at which the downlink radio link cannot be reliably received and corresponds to 10% and 2% block error rate of a hypothetical PDCCH transmissions respectively.

Sampling of Measurement

The overall serving cell or neighbour cell measurement quantity results comprises of non-coherent averaging of 2 or more basic non-coherent averaged samples. The exact sampling depends upon the implementation and is generally not specified. An example of RSRP measurement averaging in E-UTRAN is shown in FIG. 2. The figure illustrates that the UE obtains the overall measurement quantity result by collecting four non-coherent averaged samples or snapshots (each of 3 ms length in this example) during the physical layer measurement period (i.e., 200 ms) when no discontinuous reception (DRX) is used or when DRX cycle is not larger than 40 ms. Every coherent averaged sample is 1 ms long. The sampling also depends upon the length of the DRX cycle. For example for DRX cycle >40 ms, the UE typically takes one sample every DRX cycle over the measurement period.

A similar measurement sampling mechanism is used for other signal measurements by the UE and also by the base station (BS) for UL measurements.

SUMMARY

Disclosed is a wireless device comprising a processor and a memory. The memory contains instructions executable by the processor whereby the wireless device is operable to adapt, based on one or more pre-defined rules or criteria, a minimum number of a first type of cells, Min_type_1, and a minimum number of a second type of cells, Min_type_2, for which the wireless device is to perform radio measurements during an at least partly overlapping measurement time, T0, wherein the first type of cell transmits at least one type of reference signal in every subframe of the first type of cell over T0 and the second type of cell does not transmit any type of reference signal in at least one subframe over T0 of the second type of cell. The wireless devices is operable to perform the radio measurement on radio signals from at least Min_type_1 of the first type of cells and at least Min_type_2 of the second type of cells during T0, and to use the radio measurements for one or more radio tasks.

Also disclosed is a computer program product for a wireless device. The computer program product comprises a non-transitory computer readable storage medium having computer readable program code embodied in the medium. The computer readable program code comprises computer readable program code to adapt, based on one or more pre-defined rules or criteria, a minimum number of a first type of cells, Min_type_1, and a minimum number of a second type of cells, Min_type_2, for which a radio measurement is to be performed during an at least partly overlapping measurement time, T0, wherein the first type of cell transmits at least one type of reference signal in every subframe of the first type of cell over T0 and the second type of cell does not transmit any type of reference signal in at least one subframe of the second type of cell over T0; computer readable program code to perform the radio measurements on radio signals from at least Min_type_1 of the first type of cells and at least Min_type_2 of the second type of cells during T0; and computer readable program code to use the radio measurements for one or more radio tasks.

Also disclosed is a method in a wireless device, comprising adapting, based on one or more pre-defined rules or criteria, a minimum number of a first type of cells, Min_type_1, and a minimum number of a second type of cells, Min_type_2, for which a radio measurement is to be performed by the wireless device during an at least partly overlapping measurement time, T0, wherein the first type of cell transmits at least one type of reference signal in every subframe of the first type of cell over T0 and the second type of cell does not transmit any type of reference signal in at least one subframe of the second type of cell over T0; performing the radio measurements on radio signals from at least Min_type_1 of the first type of cells and at least Min_type_2 of the second type of cells during T0; and using the radio measurements for one or more radio tasks.

In some embodiments, at least one of the pre-defined rules or criteria for adapting at least one of Min_type_1 and Min_type_2 is received from the network node. In some embodiments, at least one of the pre-defined rules or criteria for adapting at least one of Min_type_1 and Min_type_2 is retrieved from memory of the wireless device. In some embodiments, the sum of Min_type_1 plus Min_type_2 is less than or equal to a minimum number of total cells, M_total, that are to be measured by the wireless device during T0. In some embodiments, at least one of Min_type_1 and Min_type_2 is received from the network node. In some embodiments, at least one of Min_type_1 and Min_type_2 is determined by the wireless device autonomously.

In some embodiments, Min_type_1 comprises a first number of the first type of cells on a serving carrier and a second number of the first type of cells on a non-serving carrier and/or Min_type_2 comprises a first number of the second type of cells on the serving carrier and a second number of the second type of cells on the non-serving carrier.

In some embodiments, Min_type_1 comprises a first number of the first type of cells on a serving radio access technology and a second number of the first type of cells on a non-serving radio access technology and/or Min_type_2 comprises a first number of the second type of cells on the serving radio access technology and a second number of the second type of cells on the non-serving radio access technology.

In some embodiments, Min_type_2 is determined based on a periodicity (Tp) with which a discovery reference signal (DRS) burst is transmitted in the reference signal configuration of the second type of cells. In some embodiments, Min_type_2 is determined based on the length of a discovery reference signal (DRS) burst in the second type of cells. In some embodiments, Min_type_2 is determined based on one or any combination of the following: periodicity of a DRS burst, length of the DRS burst, signal quality, location, number of the second type of cells relative to number of the first type of cells in proximity to the wireless device, DRS type, and priority factor.

In some embodiments, the radio task corresponds to at least one of: reporting radio measurements to the network node; determining the wireless device's position; and performing cell change.

Also disclosed is a network node comprising a processor and a memory, wherein said memory contains instructions executable by said processor whereby the network node is operable to: determine one or more pre-defined rules or criteria to be used by a wireless device for adapting a minimum number of a first type of cells, Min_type_1, and a minimum number of a second type of cells, Min_type_2, for which the wireless device is to perform radio measurements during an at least partly overlapping measurement time, T0, wherein the first type of cell transmits at least one type of reference signal in every subframe of the first type of cell over T0 and the second type of cell does not transmit any type of reference signal in at least one subframe of the second type of cell over T0; and send the determined one or more pre-defined rules or criteria to the wireless device.

Also disclosed is a computer program product for a network node, the computer program product comprising a non-transitory computer readable storage medium having computer readable program code embodied in the medium, the computer readable program code comprising: computer readable program code to determine one or more pre-defined rules or criteria to be used by a wireless device for adapting a minimum number of a first type of cells, Min_type_1, and a minimum number of a second type of cells, Min_type_2, for which the wireless device is to perform radio measurements during an at least partly overlapping measurement time, T0, wherein the first type of cell transmits at least one type of reference signal in every subframe of the first type of cell over T0 and the second type of cell does not transmit any type of reference signal in at least one subframe of the second type of cell over T0; and computer readable program code to send the determined one or more pre-defined rules or criteria to the wireless device.

Also disclosed is a method in a network node. The method comprises determining one or more pre-defined rules or criteria to be used by a wireless device for adapting a minimum number of a first type of cells, Min_type_1, and a minimum number of a second type of cells, Min_type_2, for which the wireless device is to perform radio measurements during an at least partly overlapping measurement time, T0, wherein the first type of cell transmits at least one type of reference signal in every subframe of the first type of cell over T0 and the second type of cell does not transmit any type of reference signal in at least one subframe of the second type of cell over T0; and sending the determined one or more pre-defined rules or criteria to the wireless device.

In some embodiments, the one or more pre-defined rules or criteria to be used by the wireless device is determined based on one or any combination of the following conditions or scenarios: cell load, interference in cell, and the wireless device's speed.

In some embodiments, the method further comprises receiving a measurement report from the wireless device, the measurement report including radio measurements for at least Min_type_1 of the first type of cells and at least Min_type_2 of the second type of cells during T0; and using the measurement report received from the wireless device to perform one or more radio tasks.

Some embodiments of the disclosure may provide one or more technical advantages. Some embodiments may benefit from some, none, or all of the advantages. Other technical advantages may be readily ascertained by one of ordinary skill in the art. An example of a technical advantage of certain embodiments includes the UE is able to perform measurements on an adequate number of legacy cells as well as cells operating with an on/off scheme. Another example of a technical advantage of certain embodiments includes enhancing mobility performance in a deployment scenario comprising of mixture of cells (e.g., legacy cells and cells operating with on/off scheme). Another example of a technical advantage of certain embodiments includes the ability to dynamically adapt the total number of legacy and on/off cells on which UE performs measurements depending on one or more criteria. This ensures that overall the UE can measure on sufficient number of cells. Yet another example of a technical advantage of certain embodiments includes on/off cells can adapt to different DRS parameters suitable for certain UE to measure on a second type of cells.

BRIEF DESCRIPTION OF THE DRAWINGS

For a more complete understanding of the present disclosure and its features and advantages, reference is now made to the following description, taken in conjunction with the accompanying drawings.

DETAILED DESCRIPTION

Figure 1:
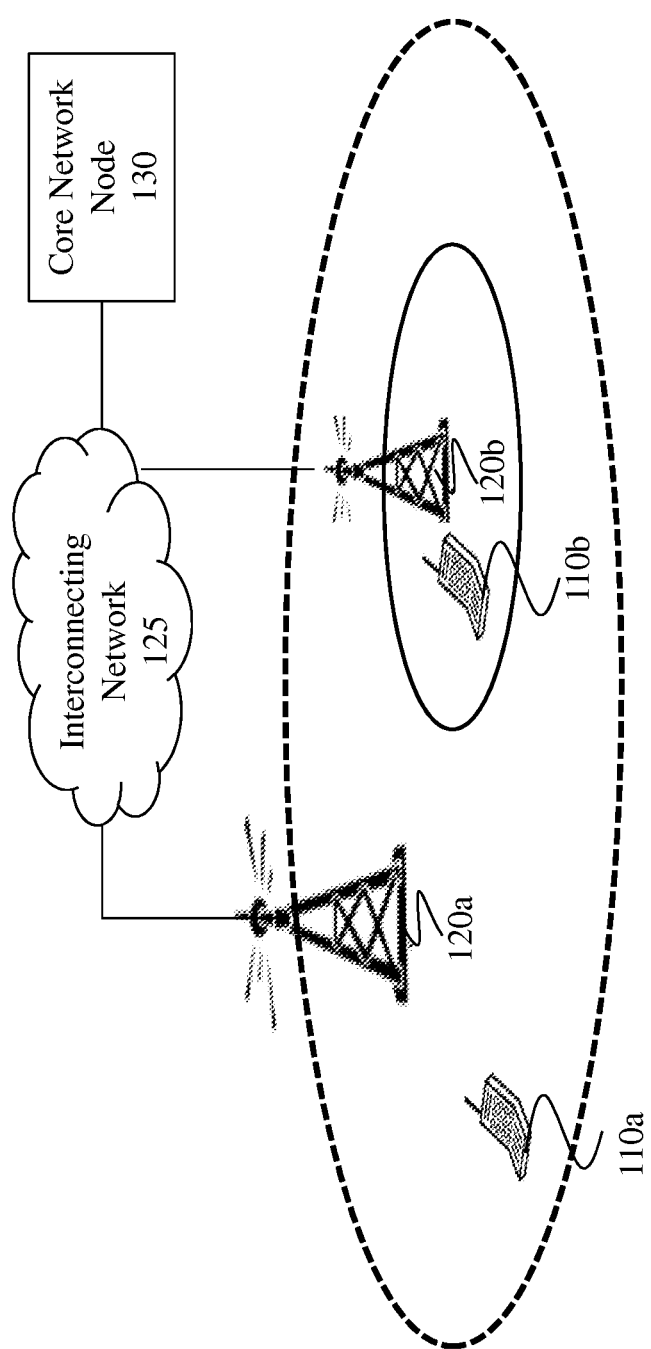
FIG. 1 is a block diagram illustrating an example of a wireless network.
Figure 2:
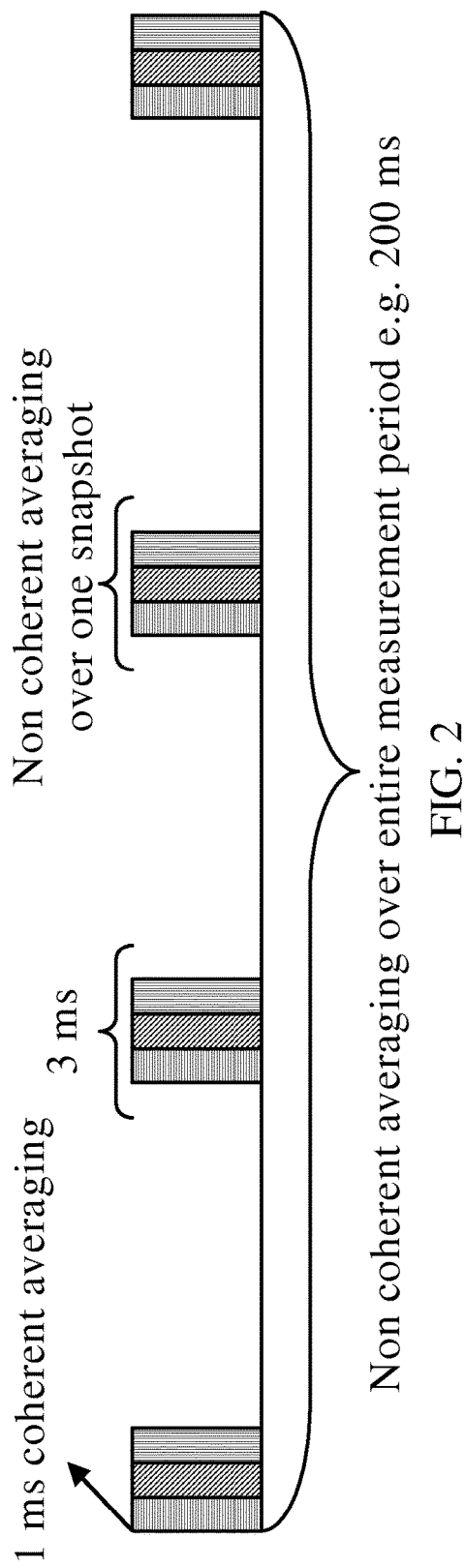
FIG. 2 is a diagram illustrating an example of Reference Signal Receive Power (RSRP) measurement averaging in Evolved Universal Terrestrial Radio Access Network, E-UTRAN.

Particular embodiments will now be described more fully hereinafter with reference to the accompanying drawings, however, other embodiments may include many different forms and should not be construed as limited to the examples set forth herein. Embodiments of the disclosure need not be mutually exclusive, and components described with respect to one embodiment may be used in another embodiment.

A UE must perform certain measurements on reference signals transmitted from a cell with certain periodicity. When measuring an on/off cell, the on/off scheme changes the availability of such reference signals and therefore has direct impact on the measurement procedure as well as the performance of the measurements. Also, in a network with different types of cells where cells with on/off schemes exist together with legacy cells, a UE must be able to perform measurements on all cells and report the measurements to the network. Hence it is necessary that there is a mechanism to efficiently perform measurements on enough number of cells with on/off scheme together with legacy cells. Particular embodiments of the present disclosure may allow for efficient measurement of the reference signals in networks having both small cells with on/off scheme and legacy cells.

Under normal operation of cells, a UE performs measurements on reference signals that are transmitted periodically by the network node. For example CRSs are transmitted in every subframe and PSS/SSS are transmitted every 5th subframe. So the UE assumes that the reference signals are available with predefined configurations, for example, CRS in every subframe, and/or PSS/SSS in every 5th subframe. In small cell on/off scheme, discovery bursts (i.e., subframe(s) carrying DRS) are transmitted sparsely. Furthermore the network node may transmit them with one of the several pre-defined configurations, for example, in terms of length of discovery burst, periodicity of discovery burst, etc.

A UE performs measurements on different cells including both legacy cells and cells with the on/off feature. The UE can only measure a limited number of cells on a carrier due to limited hardware and memory resources. Due to more availability of the legacy cells, the UE will most likely perform measurements on the legacy cell and report those measurements. If only legacy cells are measured and reported to the network, the cells operating in on/off scheme or mode might not be used for certain radio operations or procedures that rely on UE radio measurements (e.g., on/off cells might not be used for cell change, etc.). This means such cells operating in on/off scheme will be under-utilized and hence the overall network performance is impacted. In particular, the UE mobility performance will be degraded. Furthermore the legacy cells will be overburdened to accommodate more UEs due to lack of handover/cell change to cells using on/off scheme. This in turn will also degrade the UE performance (e.g. lower user throughput).

To address this and other problems, particular embodiments of the present disclosure ensure that the UE is able to perform measurements efficiently when cells with on/off scheme are used together with legacy cells.

The disclosure contemplates several embodiments, some embodiments relate to functionality of a network node 120 or 130 and some embodiments related to functionality of a wireless device/UE 110. Particular embodiments relate to the determination of a minimum number of legacy cells (Min_LC) and a minimum number of cells operating with on/off scheme (Min_on_off) based on one or more suitable pre-defined rules/criteria, and performing UE radio measurements on the determined cells.

More specifically, steps performed by wireless device 110 may comprise:

Obtaining one or more pre-defined rule or criteria for determining the minimum number of a first type of cells (Min_LC) and/or the minimum number of a second set of cells (Min_on_off) to be measured by the wireless device 110 during at least partly overlapping measurement time (T0), wherein the first type of cell transmits at least one type of reference signal in every subframe over T0, and the second type of cell does not transmit any type of reference signal in all the subframes over T0.

Performing one or more radio measurements on the first and/or the second set of cells based on the obtained pre-defined rules or criteria while meeting a constraint that Min_LC +Min_on_off≤M_total; where M_total is a total minimum number of the first and the second types of cells that are to be measured by the wireless device 110 during T0.

Using the performed measurements for one or more radio tasks (e.g. reporting measurement results to a network node).

The steps performed in a network node serving a wireless device 110 may comprise:

Obtaining one or more pre-defined rule or criteria to be used by the wireless device 110 for determining the minimum number of a first type of cells (Min_LC) and/or the minimum number of a second set of cells (Min_on_off) to be measured by the wireless device 110 during at least partly overlapping measurement time (T0), wherein the first type of cell transmits at least one type of reference signal in every subframe over T0, and the second type of cell does not transmit any type of reference signal in all the subframes over T0.

Configuring the wireless device 110 with one or more pre-defined rules or criteria to be used by the wireless device 110 for determining the parameters Min_on_off and Min_LC while meeting a constraint that Min_LC+Min_on_off≤M_total; where M_total is a total minimum number of the first and the second types of cells that are to be measured by the wireless device 110 during T0.

Using the reported measurements by the wireless device 110 to perform one or more radio tasks (e.g. reconfiguration of its own discovery signal parameters, signal to a neighboring on/off cell on adjusting its DRS parameters, cell reselection decisions, etc.).

In the rest of this disclosure, on/off cell refers to a cell where on/off scheme is configured, and a legacy cell is a cell with no on/off scheme, i.e., the cell is always on. The legacy cells are also interchangeably called as a first type of cells. The legacy cell scheme (i.e., non on/off scheme or non on/off cell scheme) or a first type of scheme is characterized by a reference signal transmission comprising of a first reference signal (RS) configuration. In the first RS configuration the network node (i.e., legacy cell 120a) transmits at least one type of RS in every subframe, such as a CRS in every subframe. However other RS, such as PSS/SSS, CSI-RS, etc. may still be transmitted only in some of the subframes. Moreover, the legacy cells are in "always on" state unless otherwise signaled by the network. This essentially means that legacy cells or first kind of cells have certain broadcast signals for every subframe unless otherwise mentioned.

The on/off cells are also interchangeably called as a second type of cells. The on/off scheme or on/off cell scheme or a second type of scheme is characterized by a reference signal transmission comprising of a second reference signal (RS) configuration. In the second RS configuration, the network node (i.e., on/off cell 120b) does not transmit any of the RS in all the subframes. That is, while certain subframes transmit certain reference signals, other subframes do not transmit any type of reference signal such that not all subframes transmit reference signals. For example, CRS, CSI-RS, PSS/SSS, etc. may be transmitted in one subframe once every 40 ms. In another example CRSs are transmitted in 5 consecutive subframes once every 40 ms and PSS/SSS are transmitted in 1 consecutive subframe once every 40 ms. The on/off cells or second kind of cells do not necessarily have broadcast signals in every subframe.

In the following sections, particular embodiments will be illustrated in more detail. It should be noted that these embodiments are not mutually exclusive. Components from one embodiment may optionally be present in another embodiment and it will be obvious to a person skilled in the art how those components may be used in the other exemplary embodiments.

Method in a UE to Determine Number of On/Off Cells and Legacy Cells to Measure

The following parameters represent the number of cells or more specifically the number of identified cells on whose signals the UE (wireless device 110) performs one or more radio measurements during at least partially overlapping time period T0 (e.g., the layer 1 (L1) period).

M-total: the total minimum number of cells on whose signals one or more types of radio measurements are to be performed by the UE during a certain measurement period T0.

Min_LC: the minimum number of the legacy cells (i.e., first type of cells using first RS configuration) on whose signals one or more types of radio measurements are to be performed by the UE during T0.

Min_on_off: the minimum number of the on/off cells (i.e., second type of cells using second RS configuration) on whose signals one or more types of radio measurements are to be performed by the UE during T0.

Examples of radio measurements are RSRP, RSRQ, etc. Example of T0 is the physical layer measurement period which may also be referred to as the L1 measurement period or L1 period. The L1 period used by the UE for measuring on first type of cells may be the same or may be different compared to L1 period used by the UE for measuring on second type of cells. For example the L1 period for measuring on second type of cells may be longer than L1 period for measuring on first type of cells. But their L1 periods may at least partly overlap. This is because in the latter case the DRS signals typically occur less frequently. Therefore the term T0 is at least a partially overlapping time over which radio measurements are done on first and second types of cells. The radio measurements are to be performed on identified cells, that is, on cells that have been detected or identified by the UE. Therefore, parameters M_total, Min_LC, and Min_on_off represent the minimum number of identified cells. After identifying a cell, the UE regularly performs radio measurements (such as RSRP measurements) on the identified cell over T0.

The values of the parameters M_total, Min_LC and Min_on_off can be:
  pre-defined;
  configured by the network node;
  decided autonomously by the UE based on a criteria or certain constraint, such as the constraint that (Min_LC+Min_on_off)<M_total. In certain embodiments where Min_LC+Min_on_off<M_total, the UE may measure the Min_LC number legacy cells plus the Min_on_off number of legacy cells plus a number N of additional cells such that the number of cells measured during T0 is greater than or equal to M_total. In some embodiments, each of the N additional cells may be of any type. For example, an additional cell may be a cell with the next best signal regardless of whether the cell is a legacy cell or an on/off cell;
  some parameter(s) can be pre-defined while remaining ones may be configured by the network node. For example M_total may be pre-defined whereas Min_LC and Min_on_off may be configured by the network node.

In some embodiments, the M_total cells may be assumed to be measured on the same carrier frequency, i.e., first and second type of cells operating on the same carrier. In this case the variables M_total, Min_LC and Min_on_off can be per carrier frequency. The value of these parameters may be the same or different for different carriers. For example, M_total can be 8 for the serving carrier (e.g., for primary component carrier (PCC) or secondary component carrier (SCC)) and 4 for the non-serving carrier. However, the embodiments are also applicable for the case when M_total cells denotes the number of cells belonging to different carriers where, for example, some cells are on the same carrier and some cells are on different carriers. Moreover, the embodiments are also applicable for different RATs when M_total cells denotes the number of cells belonging to different RATs (e.g. some cells on the same RAT and some cells on different RATs).

According to this aspect of the disclosure, at least the minimum number of the second type of cell (i.e., on/off cells) on whose signals the one or more radio measurements are to be performed by the UE is determined based on one or more pre-defined rules. In case there is plurality of pre-defined rules, then the UE may also be configured by the network node with the specific pre-defined rule to be used for determining the value of Min_on_off. The UE may perform one or more measurements on the first type of cells (i.e., legacy cells) and the second type of cells (i.e., on/off cells) based on the obtained rule or criteria while meeting the following constraints:

$$(\text{Min\_}LC+\text{Min\_on\_off}) \leq M\_\text{total} \qquad (1)$$

In summary, the following steps are done in the UE/wireless device 110:
- After determining the values of the parameters (Min_LC, Min_on_off and M_total) based one or more predetermined rules and/or on suitable criteria,
- the UE performs one or more radio measurements on the minimum number of cells (i.e., Min_LC and Min_on_off), and
- uses the measurement results for one or more purposes or tasks. Examples of such tasks are reporting the measurement results to the network node, using the measurement results for one or more procedures (e.g., for cell change, for positioning, etc.).

In the following sections we discuss different rules or criteria for the number of measurement on legacy cells and on/off cells.

Examples of Pre-Defined Rules or Criteria for Determining Number of Cells to Measure According to this method, one or more parameters related to minimum number of cells (Min_LC and/or Min_on_off) on which measurements are performed by the UE is based on one or combination of predetermined rules and/or on suitable criteria. For determining the number of cells for measurements, the UE may:
- itself select one or more pre-defined rules/criteria, or
- the UE uses all available pre-defined rules/criteria, or
- the UE can be configured by the network node with one or more pre-defined rules/criteria Several examples of pre-defined rules/criteria are listed below:

Example Rule 1: Determining Number of Cells to Measure Based on the Periodicity of On/Off Scheme:

According to this method, the minimum number of at least second type of cells on which measurements are to be performed is determined based on the periodicity with which the DRS burst is transmitted in the second RS configuration, which may be referred to as periodicity (Tp) of the on/off scheme in some embodiments. In other words at least the Min_on_off is adapted based on the periodicity (Tp). The parameter Min_LC may then also be determined based on Min_on_off and using the constraint in (1). The UE obtains the value of Tp from higher layer signaling message received from the network node. The UE may also obtain the value of Tp by retrieving it from the memory or by blindly detecting the reception of DRS signals at regular intervals.

Figure 3:
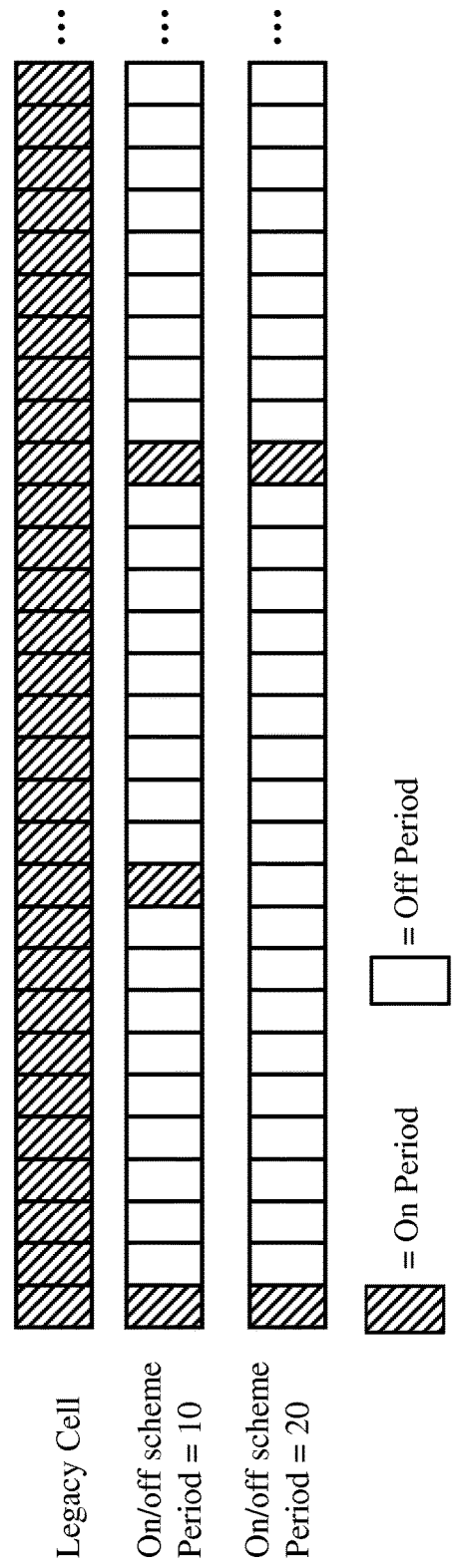
FIG. 3 is a diagram illustrating examples of on and off intervals for different types of cells, according to a particular embodiment.

FIG. 3 is a diagram illustrating examples of on and off intervals for different types of cells, according to a particular embodiment. Note that in this figure, the time unit can be radio frame, subframe, a burst of subframes, etc. The figure shows that a legacy cell is on during every time unit. The figure also shows an example of an on/off cell with a period of 10 such that the cell is off except for time units 0, 10, and 20 (and so on). The figure also shows an example of another on/off cell with a different period, a period of 20, such that the cell is off except for time units 0 and 20 (and so on).

A DRS burst occurs during the on period of the on/off cell. Thus, the length of the off period affects the periodicity of the DRS burst. If the periodicity of the DRS burst is larger than a threshold (e.g., 80 ms) then the UE may be required to perform measurements on fewer number of second type of cells (i.e., on/off cells). In this case, UE can set Min_on_off to a lower number, such as 2 cells. But, if DRS burst periodicity is equal to or below a threshold (denoted as T_threshold, which could be 80 ms in certain embodiments), then the UE may be required to perform measurements on larger number of second type of cells. More specifically the Min_on_off can be determined based on a certain threshold for the periodicity of on/off schemes as follows: if Tp<=T_threshold then Min_on_off cells≥m; otherwise Min_on_off cells≤n (where m>n). Once UE determines Min_on_off then it can derive the value of Min_LC using Eq. (1). The parameter, "T_threshold" is a threshold that can be predetermined, autonomously determined by the UE, or configured by the network node. Example of Tp is 80 ms. Examples of m and n are 5 and 2, respectively.

Example Rule 2: Determining Number of Cells to Measure Based on a Length of DRS Burst In some embodiments, the minimum number of at least second type of cells (i.e. on/off cells) on which measurements are performed by the UE is determined based on the length of the DRS burst (e.g., the discovery burst). As an example, in the current small cell on/off scheme that is being standardized by the 3GPP, the discovery burst can have a length ranging between 1 subframe and 5 subframes. One example of a pre-defined rule is that the value of parameter Min_on_off can be larger for larger bursts. A larger burst means larger number of DRS signals (i.e., more dense DRS signals in time and frequency) are available for measurement at the UE. The advantage of this method is that if the bursts are longer (e.g. 3-5 ms), then the measurements are more accurate due to more dense availability of reference signals. Therefore, it is useful to do measurements on larger number of second type of cells and report such measurements which are also more accurate. This may improve mobility performance since mobility decisions rely on UE radio measurement results. On the other hand, if the DRS burst is shorter (e.g., 1 or 2 ms), then the accuracy of measurement might be less accurate, and it may be better to measure on larger number of first type of cells (i.e. on legacy cells).

More specifically the Min_on_off can be determined based on a certain length of DRS burst as follows: if DRS burst is longer (e.g., 3-5 ms), then Min_on_off cells≥m and Min_LC cells≤n; otherwise, if DRS burst is shorter (e.g. 1-2 ms), then Min_on_off cells≤n and Min_LC cells≥m (where m>n). Once UE determines Min_on_off then it can derive the value of Min_LC using Eq. (1). The values for m and n as derived in this embodiment (Example Rule 2) and the previous embodiment (Example Rule 1) may not necessarily be the same.

Example Rule 3: Determining Number of Cells to Measure Based on Signal Quality

According to this method, the minimum number of at least second type of cells (i.e., on/off cells) on which measurements are performed by the UE is determined based on signal quality of a cell on which measurement is to be done. Examples of signal quality (e.g., SINR) are the received signal qualities at the UE of any one or more of DRS signal. Examples of DRS signals are CRS, PSS/SSS (also known as synchronization channel (SCH)), CSI-RS, etc. This is elaborated with several examples:

As an example:
- Min_LC=4 cells provided the signal quality (e.g., CRS SINR, SCH SINR, etc.) of all the 4 cells is above a threshold, and
- Min_on_off=4 cells provided the signal quality (e.g., CRS SINR, SCH SINR, etc.) of all 4 cells is also above a threshold.

In another example:
- Min_LC=2 cells provided the signal quality (e.g., CRS SINR, SCH SINR, etc.) of only 2 cells is above a threshold, and Min_on_off=6 cells provided the signal quality (e.g., CRS SINR, SCH SINR, etc.) of all 6 cells is also above a threshold.

In yet another example:

Min_LC=3 cells provided the signal quality (e.g., CRS SINR, SCH SINR, etc.) of only 3 cells is above a threshold, and Min_on_off=2 cells provided the signal quality (e.g., CRS SINR, SCH SINR, etc.) of only 2 cells is above a threshold.

An example of the signal quality threshold is SINR=−6 dB. The threshold can be pre-defined or configured by the network node or autonomously selected by the UE (e.g., based on its radio receiver type).

Example Rule 4: Determining Number of Cells to Measure Based on UE Location

In some embodiments, the minimum number of at least second type of cells (i.e., on/off cells) on which measurements are performed by the UE is determined based on location of the UE. For example at certain location of the UE in its serving cell (e.g., in part of cell border region) there are more closely deployed second type of cells, whereas at some other locations, such as close to the base station, the UE may observe larger number of first type of cells. The UE can therefore be informed about the location (e.g., geographical coordinates) and also the type of cells in that location. For example, the UE can be informed that x % and y % of cells are of first and second types respectively at a particular location or K and L number of cells of first and second types respectively at a particular location in the serving cell of the UE. This type of mapping information between location and type of cells can also be pre-defined in the form of lookup table.

The UE location in the cell can be determined by using one or combination of positioning methods such as GNSS, A-GNSS, OTDOA, enhanced cell ID (E-CID), etc. The positioning methods such as OTDOA and E-CID in turn rely on UE and/or base station radio measurements such as RSRP and RSRQ measurements, timing measurements (e.g., UE Rx-Tx time difference), angle of arrival of signal measured at base station, etc.

The UE location can be determined by the UE itself and/or by the network node. In the latter case the UE can be informed by the network node about its location. The UE uses its own location and the obtained mapping information (i.e., between location and types of cells) for selecting appropriate values of the parameters Min_on_off and Min_LC. For example, if UE is located close to serving base station where most cells are of the first type then Min_LC is larger than Min_on_off.

The UE location can also be determined by the network node (e.g., eNBs) by comparing the signal quality with a threshold. For example, a node can compare the CRS SINR reported by a UE with a threshold. If the SINR is higher than certain threshold, then the UE is considered to be close the network node (e.g., eNB). Depending on the location of the network node (e.g., eNB), the network node (e.g., eNB) can signal the UE regarding the proportion of first type and second type of cells.

Example Rule 5: Determining Number of Cells to Measure Based on Type of DRS

In some embodiments, the minimum number of at least second type of cells (i.e., on/off cells) on which measurements are performed by the UE is determined based on the type of discovery signal (i.e., DRS signals) that is configured by the network node. The UE is informed by the network node about the type of DRS signals configured for transmission by the network node. The UE can perform both CRS-based RSRP measurements and CSI-RS-based RSRP measurements. The UE is also configured about the type of DRS signals to be used for the measurements e.g. CSI-RS, CRS or both.

The CSI-RS is configurable. CSI-RS is assumed in the DRS for measurement if configured by higher layers. But CRS are always transmitted. So depending on whether there is only CRS or both CRS and CSI-RS are configured for measurement, the number of type of cells to be measured will vary.

For example if CSI-RS is configured in one or more cells, then the UE may have to measure more second type of cells compared to the first type of cells, that is, in this case typically Min_on_off>Min_LC. Otherwise Min_on_off=Min_LC or Min_LC>Min_on_off.

Example Rule 6: Determining Number of Cells to Measure Based on Predefined Node Priority In a further embodiment, the UE is configured to measure first type of cells and/or second type of cells in a predefined fashion. For example, if the limit is "M_total", then serving node can configure the UE to measure up to Min_LC=α*M_total number of carriers, while UE can be configured to measure for up to Min_on_off=(1−α)*M_total carrier. Similarly, the predefined priority can be the opposite also, i.e., Min_on_off=α*M_total and Min_LC=(1−α)*M_total.

In some special cases, when both types of cells have similar priority, then α=0.5. Similarly, when only one type of cells is configured for the UE for measurement, then α=1 and a certain type of cells is given the priority and vice versa. Similar to previous embodiments, the values of the parameters M_total and/or α can be pre-defined or one or both parameters can be configured at the UE by the network node, e.g., by core network node 130 or by eNB 120 itself. The parameter M_total can also be based on the UE capability in terms of maximum total number (M_total_max) of supported measurements.

Example Rule 7: Determining Number of Cells to Measure Based on Combination of Rules and/or Criteria According to this method, the minimum number of at least second type of cells to be measured is determined based on one or more rules and/or criteria described in the preceding sections (Example Rules 1-6). For example if Tp is less than or equal a threshold (Example Rule 1) then UE could measure for example in principle up to 5 cells. But the UE may also check the signal quality (the criterion in Example Rule 3) of cells. If the signal quality (e.g., SCH SINR) is above a threshold of only 3 cells of second type, then the UE will measure only on up to 3 cells of the second type (i.e., Min_on_off=3). The Min_LC can be up to 5 cells provided their signal quality is above a threshold.

Method in a Network Node to Determine and Command the Rule or Criteria for Determining Number of Cells to Measure In some embodiments, several rules and criteria may be pre-defined, for example, in a standard. However, the UE may be requested by the network node to use a specific rule or specific combination of rules for determining the minimum number of at least second type of cells on which measurements are to be done by the UE.

The network node may decide the criteria according to the scenario or conditions in which a particular UE is operating:

For example if load in cells and/or interference in cells is higher than a threshold then the network node to use at least criterion based on signal quality. Examples of cell load are total number of active UEs per cell, channel usage such as resource block (RB) usage, etc. Load in a cell is considered high if total active UEs=60% or above of the maximum number of UEs that can be accommodated and/or channel usage is 70% or above of total channels in a cell.

On the other hand if UE is moving at a higher speed (e.g., 70 km/hr or more) then the network node may configure the UE to use more than one criterion including the one based on length of DRS burst for determining the number of cells to measure. This is because at higher speed cell change is more frequent and therefore more accurate radio measurements would be more critical to avoid or minimize cell change failures.

Method in a Network Node to Adapt Parameters Accounting Minimum Number of Cells Measured by UE In some embodiments, the network node may adapt one or more parameters related to DRS configuration and/or parameters signaled to the UE in measurement configuration depending upon the minimum number of first and/or second types of cells on which UE does measurements.

For example if the network node receives the measurement results of measurements which are mainly performed on first types of cells (i.e., legacy cells) but there are sufficient number of second types of cells (i.e., on/off cells) in the area then the network node may suggest one or more second types of cells to adapt one or more DRS parameters in the deployment area. For example the serving network node may request the second types of cells directly (e.g., via X2 interface) or via another network node (e.g., core network node) to reduce DRS periodicity (e.g., from 80 ms to 40 ms) and/or increase DRS burst length (e.g., from 2 to 4 subframes per burst). This will allow the UE to measure more cells of the second type and therefore the mobility performance can be enhanced.

Figure 4:
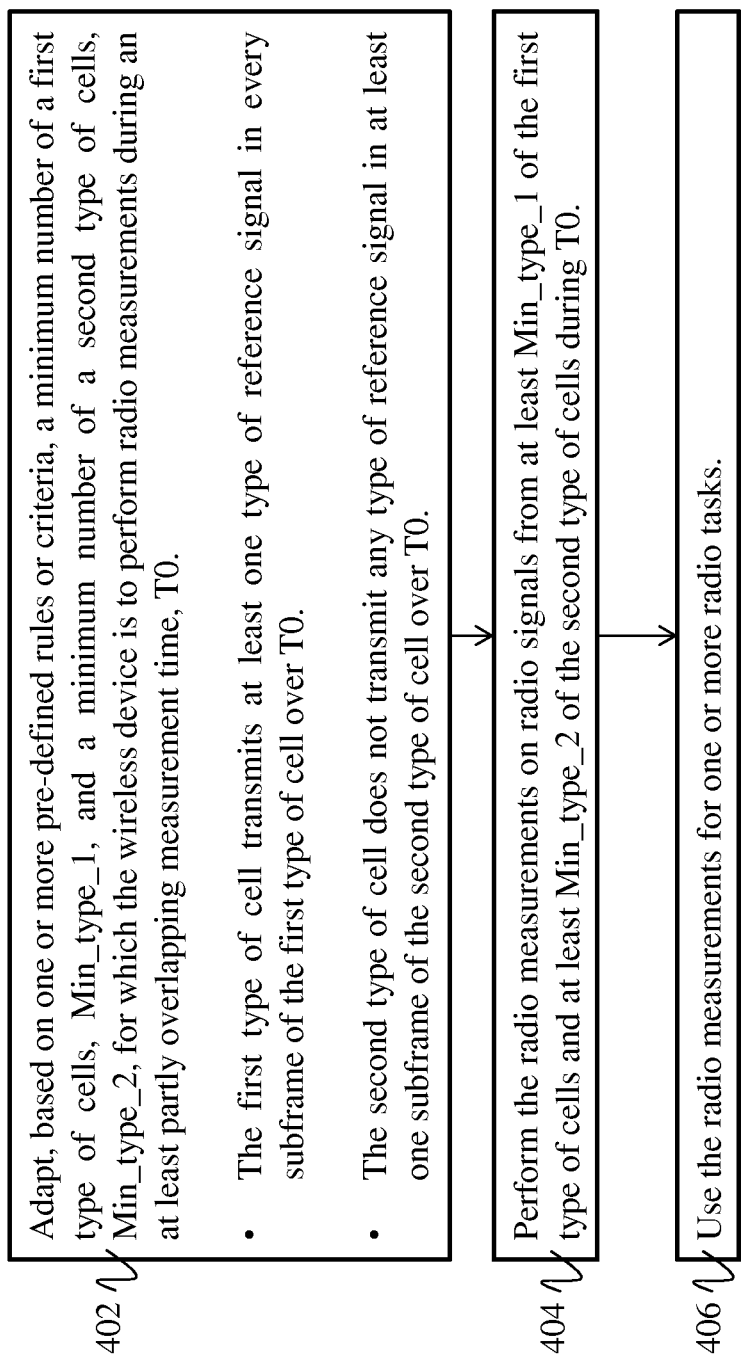
FIG. 4 is a flow diagram illustrating an example of a method in a wireless device that performs radio measurements on radio signals from multiple types of cells, according to a particular embodiment.

FIG. 4 is a flow diagram illustrating an example of a method in a wireless device 110 that performs radio measurements on radio signals from multiple types of cells, according to a particular embodiment. At step 402, wireless device 110 adapts, based on one or more pre-defined rules or criteria, a minimum number of a first type of cells, Min_type_1, and a minimum number of a second type of cells, Min_type_2, for which the wireless device is to perform radio measurements during an at least partly overlapping measurement time, T0. The first type of cell may be a legacy cell that transmits at least one type of reference signal in every subframe of the first type of cell over T0. The second type of cell may be an on/off cell that does not transmit any type of reference signal in at least one subframe of the second type of cell over T0.

The minimum number of the first type of cells, Min_type_1, may be determined in any suitable manner. As an example, Min_type_1 can be received from a wireless network node 120 or determined based on one or more pre-defined rules received from a wireless network node 120. As another example, Min_type_1 can be determined autonomously by wireless device 110, for example, based on one or more pre-defined rules retrieved from memory of wireless device 110. Similarly, the minimum number of the second type of cells, Min_type_2 can be received from a wireless network node 120, determined based on one or more pre-defined rules received from a wireless network node 120, or determined autonomously based on one or more pre-defined rules retrieved from memory of wireless device 110. The same technique can be used to determine both Min_type_1 and Min_type_2 (e.g., both types could be received from network node 120 or both types could be determined autonomously), or one technique could be used to determine Min_type_1 and another technique could be used to determine Min_type_2 (e.g., one type could be received from network node 120 and the other type could be determined autonomously).

In some embodiments, the sum of Min_type_1 plus Min_type_2 is less than or equal to a minimum number of total cells, M_total, that are to be measured by the wireless device during T0. If the sum of Min_type_1 plus Min_type_2 is less than M_total, wireless device 110 can select at least (M_total minus (Min_type_1 plus Min_type_2)) cells on which to perform the radio measurements based on criteria that is not restricted to a particular type of cell.

In some embodiments, Min_type_1 comprises a first number of the first type of cells on a serving carrier and a second number of the first type of cells on a non-serving carrier. In some embodiments, Min_type_2 comprises a first number of the second type of cells on the serving carrier and a second number of the second type of cells on the non-serving carrier.

In some embodiments, Min_type_1 comprises a first number of the first type of cells on a serving radio access technology and a second number of the first type of cells on a non-serving radio access technology. In some embodiments, Min_type_2 comprises a first number of the second type of cells on the serving radio access technology and a second number of the second type of cells on the non-serving radio access technology.

In some embodiments, Min_type_2 is determined based on a periodicity (Tp) with which a discovery reference signal (DRS) burst is transmitted in the reference signal configuration of the second type of cells. See e.g., Example Rule 1 discussed above.

In some embodiments, Min_type_2 is determined based on the length of a discovery reference signal (DRS) burst in the second type of cells. See e.g., Example Rule 2 discussed above.

In some embodiments, Min_type_2 is determined based on one or any combination of the following: periodicity of a DRS burst, length of the DRS burst, signal quality, location, number of the second type of cells relative to number of the first type of cells in proximity to the wireless device, DRS type, and priority factor. See e.g., Example Rules 1-7 discussed above.

At step 404, wireless device 110 performs the radio measurements on radio signals from at least Min_type_1 of the first type of cells and at least Min_type_2 of the second type of cells during T0. At step 406, wireless device 406 uses the radio measurements for one or more radio tasks. Examples of radio tasks include: reporting radio measurements to the network node, determining the wireless device 110's position, performing cell change, and/or any combination of the preceding.

Figure 5:
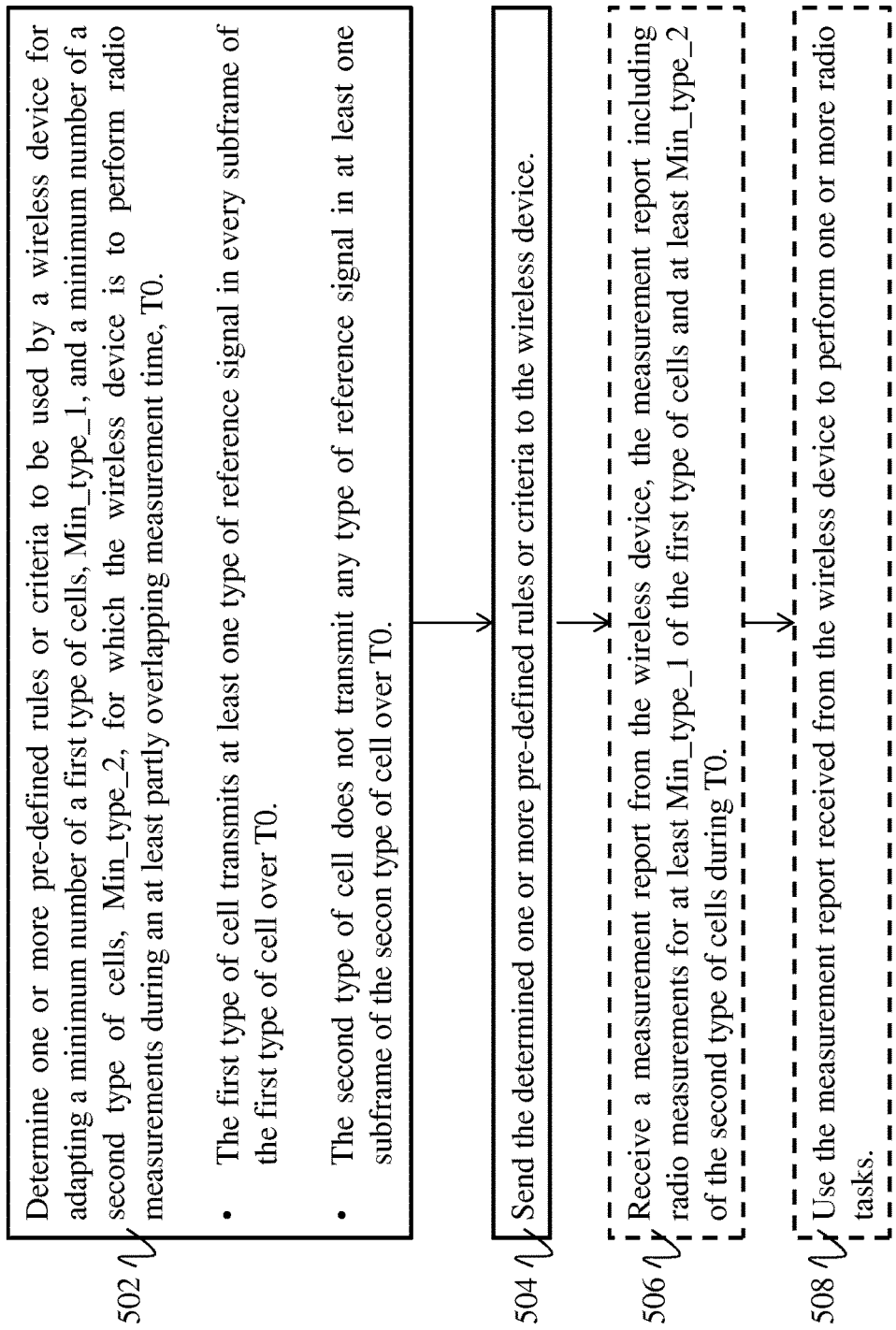
FIG. 5 is a flow diagram illustrating an example of a method in a network node that sends a wireless device pre-defined rules and/or criteria for adapting a minimum number of cells on which to perform radio measurements, according to a particular embodiment.

FIG. 5 is a flow diagram illustrating an example of a method in a network node 120 that sends a wireless device 110 pre-defined rules and/or criteria for adapting a minimum number of cells on which to perform radio measurements, according to a particular embodiment. At step 502, network node 120 determines one or more pre-defined rules or criteria to be used by the wireless device 110 for adapting a minimum number of a first type of cells, Min_type_1, and a minimum number of a second type of cells, Min_type_2, on which the wireless device 110 is to perform radio measurements during an at least partly overlapping measurement time, T0. The first type of cell may be a legacy cell that transmits at least one type of reference signal in every subframe of the first type of cell over T0. The second type of cell may be an on/off cell that does not transmit any type of reference signal in at least one subframe of the second type of cell over T0.

In some embodiments, the one or more pre-defined rules or criteria to be used by the wireless device 110 is determined based on one or any combination of the following conditions or scenarios: cell load, interference in cell, and the wireless device 110's speed.

In certain embodiments, the sum of Min_type_1 plus Min_type_2 is less than or equal to a minimum number of total cells, M_total, that are to be measured by the wireless device 110 during T0.

In some embodiments, Min_type_1 comprises a first number of the first type of cells on a serving carrier and a second number of the first type of cells on a non-serving carrier. In some embodiments, Min_type_2 comprises a first number of the second type of cells on the serving carrier and a second number of the second type of cells on the non-serving carrier.

In some embodiments, Min_type_1 comprises a first number of the first type of cells on a serving radio access technology and a second number of the first type of cells on a non-serving radio access technology. In some embodiments, Min_type_2 comprises a first number of the second type of cells on the serving radio access technology and a second number of the second type of cells on the non-serving radio access technology.

In some embodiments, Min_type_2 is determined based on a periodicity (Tp) with which a discovery reference signal (DRS) burst is transmitted in the reference signal configuration of the second type of cells. See e.g., Example Rule 1 discussed above.

In some embodiments, Min_type_2 is determined based on the length of a discovery reference signal (DRS) burst in the second type of cells. See e.g., Example Rule 2 discussed above.

In some embodiments, Min_type_2 is determined based on one or any combination of the following: periodicity of a DRS burst, length of the DRS burst, signal quality, location, number of the second type of cells relative to number of the first type of cells in proximity to the wireless device, DRS type, and priority factor. See e.g., Example Rules 1-7 discussed above.

At step 504, network node 120 sends the determined one or more pre-defined rules or criteria to the wireless device 110.

At step 506, network node 120 receives a measurement report from the wireless device 110, the measurement report including radio measurements for at least Min_type_1 of the first type of cells and at least Min_type_2 of the second type of cells during T0. At step 508, network node 120 uses the measurement report received from the wireless device 110 to perform one or more radio tasks. Examples of radio tasks include at least one of: re-configuring the DRS parameters of the network node; signaling to a neighboring cell of the second type to adjust its DRS parameters; and performing cell change. Steps 506 and 508 may be optional in certain embodiments.

Figure 6A:
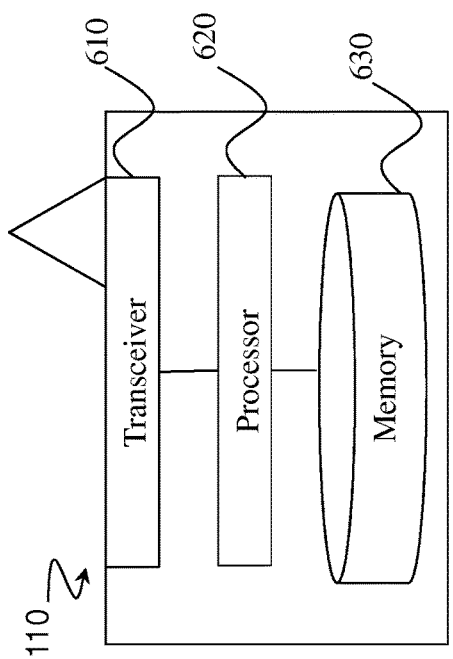
FIGS. 6A-6B are block diagrams illustrating example components of a wireless device, according to a particular embodiment.
Figure 6B:
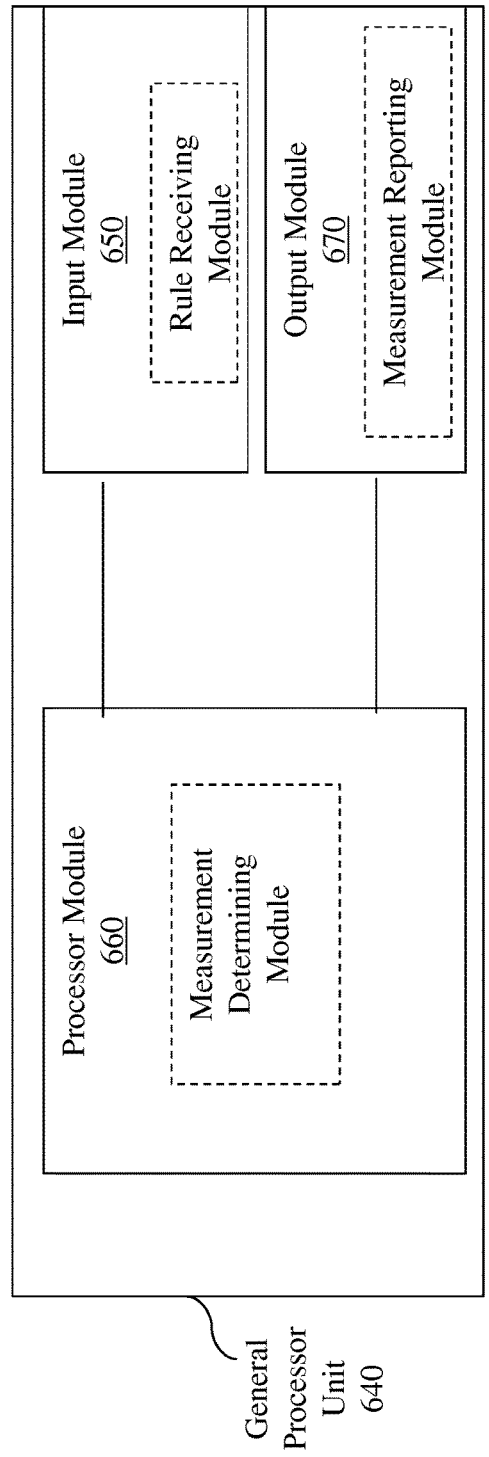

FIGS. 6A-6B are block diagrams illustrating example components of a wireless device 110, according to a particular embodiment. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication.

In the example shown in FIG. 6A, wireless device 110 includes transceiver 610, processor 620, and memory 630. In some embodiments, transceiver 610 facilitates transmitting wireless signals to and receiving wireless signals from wireless network node 120 (e.g., via an antenna), processor 620 executes instructions to provide some or all of the functionality described herein as provided by a wireless device 110 and/or some or all of the functionality described herein as provided by a UE (which may be referred to interchangeably as wireless device 110), and memory 630 stores the instructions executed by processor 620.

Processor 620 includes any suitable combination of hardware and software implemented in one or more integrated circuits or modules to execute instructions and manipulate data to perform some or all of the described functions of wireless device 110. Memory 630 is generally operable to store computer executable code and data. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 include additional components (beyond those shown in FIG. 6A) responsible for providing certain aspects of the wireless device's functionality, including any of the functionality described above and/or any additional functionality (including any functionality necessary to support the solution described above).

FIG. 6B illustrates a general processor unit 640, which in certain embodiments may be implemented as a processor 620 of wireless device 110. General processor unit 640 includes input module 650, processor module 660, and output module 670. In certain embodiments, input module 650 comprises a rule receiving module that receives one or more pre-defined rules. The rules can be received from a network node 120 and/or from memory 630 of wireless device 110. Input module 650 communicates the pre-defined rules to processor module 660. Processor module 660 comprises a measurement adapting module that determines a minimum number of a first type of cells, Min_type_1, and a minimum number of a second type of cells, Min_type_2, for which the wireless device is to perform radio measurements during an at least partly overlapping measurement time, T0, wherein the first type of cell transmits at least one type of reference signal in every subframe of the first type of cell over T0 and the second type of cell does not transmit any type of reference signal in at least one subframe of the second type of cell over T0. The measurement determining module may further facilitate performing the radio measurements on radio signals from at least Min_type_1 of the first type of cells and at least Min_type_2 of the second type of cells during T0. The measurement determining module may communicate the radio measurements to output module 670. Output module 670 may include a measurement reporting module that reports the radio measurements for use in one or more radio tasks.

Figure 7A:
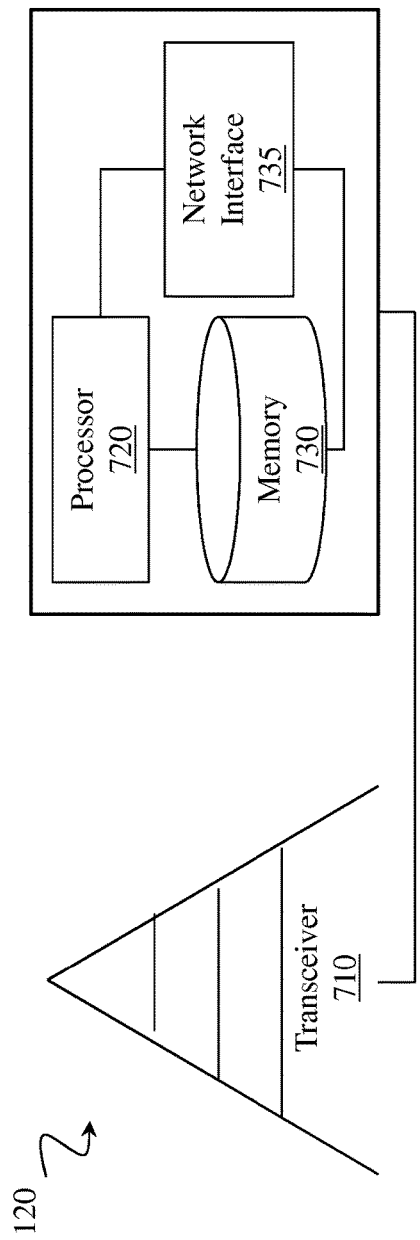
FIGS. 7A-7B are block diagrams illustrating example components of a network node, according to a particular embodiment.
Figure 7B:
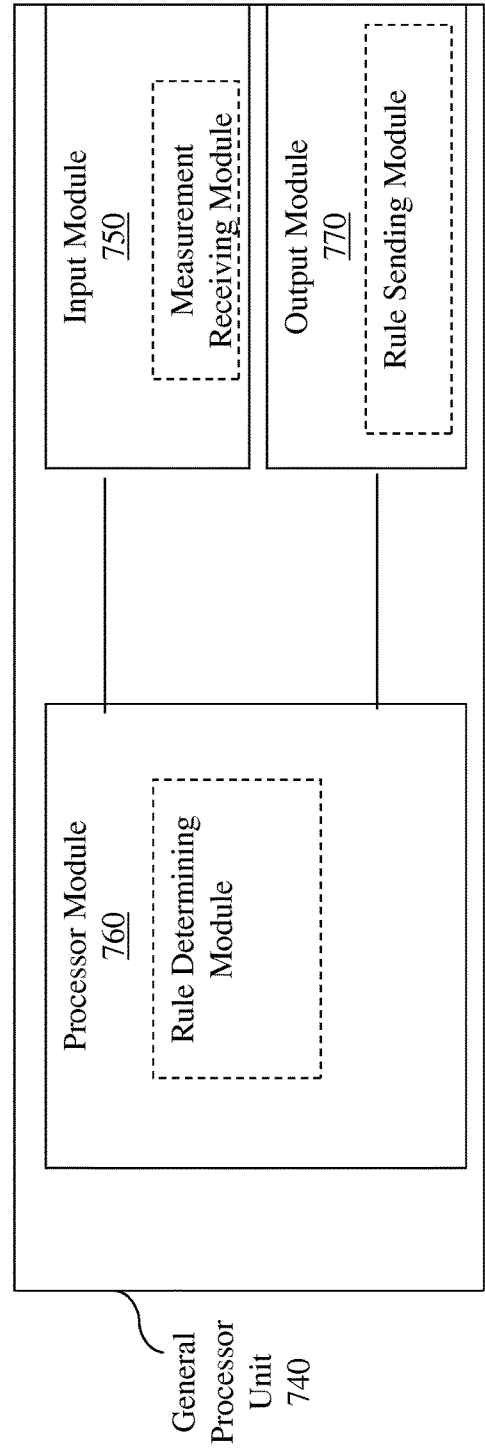

FIGS. 7A-7B are block diagrams illustrating example components of a wireless network node 120, according to a particular embodiment. Wireless network node 120 can be, for example, a radio access node, such as an eNodeB, a node B, a base station, a wireless access point (e.g., a Wi-Fi access point), a low power node, a base transceiver station (BTS), a transmission point or node, or a remote RF unit (RRU). Other network nodes, such as one or more radio network controllers, can be configured between the radio access nodes and core network nodes 130. Such other network nodes can include processors, memory, and interfaces similar to those described with respect to FIG. 7A; such other network nodes, however, might not necessarily include a wireless interface, such as transceiver 710.

In the example shown in FIG. 7A, wireless network node 120 includes at least one processor 720, at least one memory 730, and at least one network interface 740; in certain embodiments, wireless network node 120 can also include a transceiver 710. Transceiver 710 facilitates transmitting wireless signals to and receiving wireless signals from wireless device 110 (e.g., via an antenna); processor 720 executes instructions to provide some or all of the functionality described above as being provided by a wireless network node 120 (which may be referred to interchangeably as an eNodeB/base station/legacy cell/on-off cell); memory 730 stores the instructions executed by processor 720; and network interface 735 communicates signals to backend network components, such as a gateway, switch, router, Internet, Public Switched Telephone Network (PSTN), other wireless network nodes 120, and/or core network nodes 130. The processor 720 and memory 730 can be of the same types as described supra with respect to FIG. 6A.

In some embodiments, network interface 735 is communicatively coupled to processor 720 and refers to any suitable device operable to receive input for wireless network node 120, send output from wireless network node 120, perform suitable processing of the input or output or both, communicate to other devices, or any combination of the preceding. Network interface 735 includes appropriate hardware (e.g., port, modem, network interface card, etc.) and software, including protocol conversion and data processing capabilities, to communicate through a network.

Other embodiments of wireless network node 120 include additional components (beyond those shown in FIG. 7A) responsible for providing certain aspects of the node's functionality, including any of the functionality described above and/or any additional functionality (including any functionality necessary to support the solution described above). The various different types of wireless network nodes may include components having the same physical hardware but configured (e.g., via programming) to support different radio access technologies, or may represent partly or entirely different physical components.

FIG. 7B illustrates a general processor unit 740, which in certain embodiments may be implemented as a processor 720 of network node 120. General processor unit 740 includes input module 750, processor module 760, and output module 770. Processor module 760 may include a rule determining module configured to determine one or more pre-defined rules or criteria to be used by the wireless device for adapting a minimum number of a first type of cells, Min_type_1, and a minimum number of a second type of cells, Min_type_2, for which the wireless device is to perform radio measurements during an at least partly overlapping measurement time, T0, wherein the first type of cell transmits at least one type of reference signal in every subframe of the first type of cell over T0 and the second type of cell does not transmit any type of reference signal in at least one subframe of the second type of cell over T0. Processor module 760 may communicate the rule(s)/criteria to output module 770. Output module 770 may include a rule sending module that sends the rule(s)/criteria to the wireless device. In response, the wireless device may send a measurement report to the network node with radio measurements for at least Min_type_1 of the first type of cells and at least Min_type_2 of the second type of cells during T0. The measurement report may be received by a report receiving module of input module 750. Input module 750 may communicate the measurement report to processor module 760, and processor module 760 may use the measurement report for performing radio tasks.

Figure 8:
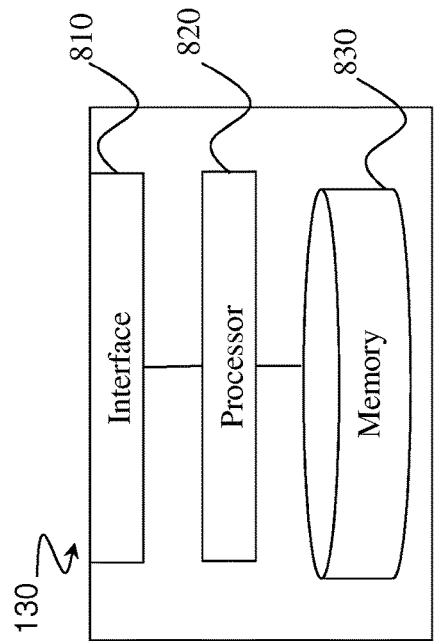
FIG. 8 is a block diagram illustrating an example of a core network node, according to a particular embodiment.

FIG. 8 is a block diagram illustrating an example of a core network node 130, according to a particular embodiment. Examples of a core network node 130 include, but are not limited to, a mobile switching center (MSC) and a serving GPRS support node (SGSN). Core network node 130 includes processor 820, memory 830, and network interface 840. Processor 820 executes instructions to provide some or all of the functionality described above as being provided by core network node 130; memory 830 stores the instructions executed by processor 820; and network interface 840 communicates signals to other network nodes. The processor 820 and memory 830 can be of the same types as described supra with respect to FIG. 6A.

In some embodiments, network interface 840 is communicatively coupled to processor 820 and may refer to any suitable device operable to receive input for core network node 130, send output from core network node 130, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network. Other embodiments of core network node 130 include additional components (beyond those shown in FIG. 8) responsible for providing certain aspects of the core network node's functionality, including any of the functionality described above and/or any additional functionality (including any functionality necessary to support the solution described above).

Examples of methods that can be performed by wireless device 110 have been described above. The following are further examples of methods in a wireless device 110. In certain embodiments, a method in a wireless device comprises determining a minimum number of legacy cells to be measured by the wireless device during a measurement time (T0), wherein the legacy cells transmit at least one type of reference signal in each subframe over T0; determining a minimum number of on/off cells to be measured by the wireless device during the measurement time (T0), wherein the on/off cells do not transmit any type of reference signal in at least one subframe over T0; measuring the minimum number of legacy cells and the minimum number of on/off cells during T0; and sending the measurements to a network node.

Various embodiments of the method may be implemented in any suitable manner, such as using any one or more of the following:

- The wireless device determines the minimum number of legacy cells and the minimum number of on/off cells based on one or more pre-defined rules.
- The wireless device receives the pre-defined rules from the network node.
- The wireless device retrieves the pre-defined rules from memory of the wireless device.
- The minimum number of legacy cells plus the minimum number of on/off cells is less than or equal to a minimum number of total cells.

The wireless device receives the minimum number of on/off cells from the network node.

The wireless device receives the minimum number of legacy cells from the network node.

The wireless device receives the minimum number of total cells from the network node.

The wireless device determines the minimum number of on/off cells autonomously.

The wireless device determines the minimum number of legacy cells autonomously.

The wireless device determines the minimum number of total cells autonomously.

The wireless device determines the minimum number of total cells from a pre-defined setting and the wireless device receives the minimum number of on/off cells and the minimum number of legacy cells from the network node.

The wireless device determines one or more of the minimum number of legacy cells, the minimum number of on/off cells, and the minimum number of total cells from a pre-defined setting.

The minimum number of legacy cells comprises a first number of legacy cells on a serving carrier and a second number of legacy cells on a non-serving carrier.

The minimum number of on/off cells comprises a first number of on/off cells on a serving carrier and a second number of legacy cells on a non-serving carrier.

The minimum number of legacy cells comprises a first number of legacy cells on a serving radio access technology and a second number of legacy cells on a non-serving radio access technology.

The minimum number of on/off cells comprises a first number of on/off cells on a serving radio access technology and a second number of legacy cells on a non-serving radio access technology.

The wireless device determines the minimum number of on/off cells based on a periodicity (Tp) with which a discovery reference signal (DRS) burst is transmitted in the on/off reference signal configuration.

The wireless device retrieves the periodicity (Tp) from memory.

The wireless device determines the periodicity (Tp) based on blind detection of the discovery reference signal (DRS) burst.

The wireless device is configured to use a lower minimum number of on/off cells for a longer periodicity (Tp) and a higher minimum number of on/off cells for a shorter periodicity (Tp).

The wireless device determines the minimum number of on/off cells based on the length of a discovery reference signal (DRS) burst.

The wireless device is configured to use a higher minimum number of on/off cells for longer DRS bursts and a lower minimum number of on/off cells for shorter DRS bursts.

The wireless device determines the minimum number of on/off cells based on signal quality of a cell on which measurement is to be done.

The wireless device determines the minimum number of on/off cells based on the SINR with which the wireless device receives a CRS, a PSS, an SSS, or a CSI-RS signal.

The wireless device determines the minimum number of on/off cells based on the location of the wireless device relative to the location of one or more legacy cells and one or more on/off cells.

The wireless device lowers the minimum number of on/off cells in response to moving from a first location having a higher on/off cell to legacy cell ratio to a second location having a lower on/off cell to legacy cell ratio.

The wireless device receives an on/off cell to legacy cell ratio for its current location from the network node.

The wireless device determines an on/off cell to legacy cell ratio from a lookup table.

The on/off cell to legacy cell ratio indicates a number of on/off cells located in proximity to the wireless device relative to a number of total cells (on/off cells plus legacy cells) located in proximity to the wireless device (x %).

The on/off cell to legacy cell ratio indicates a number of legacy cells located in proximity to the wireless device relative to a number of total cells (on/off cells plus legacy cells) located in proximity to the wireless device (y %).

The on/off cell to legacy cell ratio indicates a number of on/off cells located in proximity to the wireless device relative to a number legacy cells located in proximity to the wireless device.

The wireless device determines the minimum number of on/off cells based on a type of discovery signal configured by the network node.

The wireless device uses a higher minimum number of on/off cells when the network node configures Channel State Information-Reference Signals (CSI-RS) and a lower minimum number of on/off cells when the network node does not configure CSI-RS.

The wireless device determines the minimum number of on/off cells based on a priority factor ($\alpha$).

The wireless device determines the minimum number of on/off cells based on a combination of at least two of the following: periodicity of a DRS burst, length of the DRS burst, signal quality, location, number of on/off cells relative to number of legacy cells in proximity to the wireless device, DRS type, and priority factor.

The wireless device adjusts the minimum number of on/off cells based on current network conditions.

The wireless device to determines the minimum number of on/off cells based on signal quality during times that a cell load exceeds a load threshold and to determine the minimum number of on/off cells based on criteria other than signal quality during times that the cell load is below the load threshold.

The wireless device determines the minimum number of on/off cells based on signal quality alone during times that a cell load exceeds a load threshold and to determine the minimum number of on/off cells based on signal quality and at least one other criteria during times that the cell load is below the load threshold.

The wireless device determines the minimum number of on/off cells based on length of DRS burst during times that the wireless device is moving at a speed that exceeds a speed threshold and to determine the minimum number of on/off cells based on criteria other than length of DRS burst during times that the speed is below the speed threshold.

The wireless device determines the minimum number of on/off cells based on length of DRS burst alone during times that the wireless device is moving at a speed that exceeds a speed threshold and to determine the minimum number of on/off cells based length of DRS burst and at least one other criteria during times that the speed is below the speed threshold.

The following are further examples of methods in a network node 120. In one embodiment, a method in a network node comprises: sending a wireless device one or more pre-defined rules for determining a minimum number of on/off cells to be measured by the wireless device during a measurement time (T0), wherein the on/off cells do not transmit any type of reference signal in at least one subframe over T0; receiving a measurement report from the wireless device, the measurement report including measurements for the minimum number of on/off cells during T0; and using the measurement report to perform a radio task.

Various embodiments of the method may be implemented in any suitable manner, such as using any one or more of the following:

- The wireless network node sends the wireless device one or more pre-defined rules for determining a minimum number of legacy cells to be measured by the wireless device during a measurement time (T0), wherein the legacy cells transmit at least one type of reference signal in each subframe over T0.
- The wireless network node sends the wireless device one or more pre-defined rules for determining a minimum number of legacy cells to be measured by the wireless device during a measurement time (T0), wherein the legacy cells transmit at least one type of reference signal in each subframe over T0.
- The radio task corresponds to: re-configuring the wireless network node's own discovery signal parameters, signaling to a neighboring on/off cell on adjusting its DRS parameters, or making cell reselection decisions.
- The radio task corresponds to instructing an on/off cell to reduce DRS periodicity.
- The radio task corresponds to instructing an on/off cell to increase DRS burst length.
- The wireless network node communicates instructions to the on/off cell via X2 interface or via a core network node.
- The minimum number of legacy cells plus the minimum number of on/off cells is less than or equal to a minimum number of total cells.
- The minimum number of legacy cells comprises a first number of legacy cells on a serving carrier and a second number of legacy cells on a non-serving carrier.
- The minimum number of on/off cells comprises a first number of on/off cells on a serving carrier and a second number of legacy cells on a non-serving carrier.
- The minimum number of legacy cells comprises a first number of legacy cells on a serving radio access technology and a second number of legacy cells on a non-serving radio access technology.
- The minimum number of on/off cells comprises a first number of on/off cells on a serving radio access technology and a second number of legacy cells on a non-serving radio access technology.
- The pre-defined rules cause the wireless device to determine the minimum number of on/off cells based on a periodicity (Tp) with which a discovery reference signal (DRS) burst is transmitted in the on/off reference signal configuration.
- The pre-defined rules cause the wireless device to use a lower minimum number of on/off cells for a longer periodicity (Tp) and a higher minimum number of on/off cells for a shorter periodicity (Tp).
- The pre-defined rules cause the wireless device to determine the minimum number of on/off cells based on the length of a discovery reference signal (DRS) burst.
- The pre-defined rules cause the wireless device to use a higher minimum number of on/off cells for longer DRS bursts and a lower minimum number of on/off cells for shorter DRS bursts.
- The pre-defined rules cause the wireless device to determine the minimum number of on/off cells based on signal quality of a cell on which measurement is to be done.
- The pre-defined rules cause the wireless device to determine the minimum number of on/off cells based on the SINR with which the wireless device receives a CRS, a PSS, an SSS, or a CSI-RS signal.
- The pre-defined rules cause the wireless device to determine the minimum number of on/off cells based on the location of the wireless device relative to the location of one or more legacy cells and one or more on/off cells.
- The pre-defined rules cause the wireless device to lower the minimum number of on/off cells in response to moving from a first location having a higher on/off cell to legacy cell ratio to a second location having a lower on/off cell to legacy cell ratio.
- The wireless network node sends an on/off cell to legacy cell ratio to the wireless device.
- The on/off cell to legacy cell ratio indicates a number of on/off cells located in proximity to the wireless device relative to a number of total cells (on/off cells plus legacy cells) located in proximity to the wireless device (x %).
- The on/off cell to legacy cell ratio indicates a number of legacy cells located in proximity to the wireless device relative to a number of total cells (on/off cells plus legacy cells) located in proximity to the wireless device (y %).
- The on/off cell to legacy cell ratio indicates a number of on/off cells located in proximity to the wireless device relative to a number legacy cells located in proximity to the wireless device.
- The pre-defined rules cause the wireless device to determine the minimum number of on/off cells based on a type of discovery signal configured by the network node.
- The pre-defined rules cause the wireless device to use a higher minimum number of on/off cells when the network node configures Channel State Information-Reference Signals (CSI-RS) and a lower minimum number of on/off cells when the network node does not configure CSI-RS.
- The pre-defined rules cause the wireless device to determine the minimum number of on/off cells based on a priority factor ($\alpha$).
- The pre-defined rules cause the wireless device to determine the minimum number of on/off cells based on a combination of at least two of the following: periodicity of a DRS burst, length of the DRS burst, signal quality, location, number of on/off cells relative to number of legacy cells in proximity to the wireless device, DRS type, and priority factor.
- The pre-defined rules cause the wireless device to adjust the minimum number of on/off cells based on current network conditions.
- The pre-defined rules cause the wireless device to determine the minimum number of on/off cells based on signal quality during times that a cell load exceeds a load threshold and to determine the minimum number of on/off cells based on criteria other than signal quality during times that the cell load is below the load threshold.

The pre-defined rules cause the wireless device to determine the minimum number of on/off cells based on signal quality alone during times that a cell load exceeds a load threshold and to determine the minimum number of on/off cells based on signal quality and at least one other criteria during times that the cell load is below the load threshold.

The pre-defined rules cause the wireless device to determine the minimum number of on/off cells based on length of DRS burst during times that the wireless device is moving at a speed that exceeds a speed threshold and to determine the minimum number of on/off cells based on criteria other than length of DRS burst during times that the speed is below the speed threshold.

The pre-defined rules cause the wireless device to determine the minimum number of on/off cells based on length of DRS burst alone during times that the wireless device is moving at a speed that exceeds a speed threshold and to determine the minimum number of on/off cells based length of DRS burst and at least one other criteria during times that the speed is below the speed threshold.

In this disclosure, note that although terminology from 3GPP LTE has been used for purposes of example, this should not be seen as limiting the scope of the disclosure to only the aforementioned system. Other wireless systems, including WCDMA, HSPA, WiMax, WiFi, WLAN, and GSM/GERAN, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the disclosure is equally applicable in the uplink.

The embodiments are described with main emphasis on single carrier operation of the UE. However the embodiments are applicable for multi-carrier or carrier aggregation operation of the UE. Therefore the embodiment methods of signaling information to the UE or to the other network node can be carried out independently for each cell on each carrier frequency supported by the network node.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions also may be made to the methods disclosed herein without departing from the scope of the invention. The methods may include more, fewer, or other steps. Additionally, steps may be performed in any suitable order.

The above description of the embodiments does not constrain this disclosure. Other changes, substitutions, and alterations are possible without departing from the spirit and scope of this disclosure.

The invention claimed is:

1. A method in a wireless device, comprising:
adapting, based on one or more pre-defined rules or criteria, a minimum number (Min_type_1) of a first type of cells, and a minimum number (Min_type_2) of a second type of cells, for which the wireless device is to perform radio measurements during an at least partly overlapping measurement time (T0) comprising a plurality of subframes, wherein:
the first type of cell transmits at least one type of reference signal in every subframe comprising T0, and
the second type of cell transmits at least one type of reference signal in one or more subframes comprising T0 but does not transmit any type of reference signal in at least one other subframe comprising T0;
performing the radio measurements on reference signals received during T0 from at least Min_type_1 of the first type of cells and at least Min_type_2 of the second type of cells; and
using the radio measurements for one or more radio tasks.

2. The method of claim 1, wherein at least one of the pre-defined rules or criteria for adapting at least one of Min_type_1 and Min_type_2 is received from the network node.

3. The method of claim 1, wherein at least one of the pre-defined rules or criteria for adapting at least one of Min_type_1 and Min_type_2 is retrieved from memory of the wireless device.

4. The method of claim 1, wherein the sum of Min_type_1 plus Min_type_2 is less than or equal to a minimum number (M_total) of cells that are in total to be measured by the wireless device during T0.

5. The method of claim 1, wherein at least one of Min_type_1 and Min_type_2 is received from the network node.

6. The method of claim 1, wherein at least one of Min_type_1 and Min_type_2 is determined by the wireless device autonomously.

7. The method of claim 1, wherein at least one of the following applies:
Min_type_1 comprises a first number of the first type of cells on a serving carrier and a second number of the first type of cells on a non-serving carrier; and
Min_type_2 comprises a first number of the second type of cells on the serving carrier and a second number of the second type of cells on the non-serving carrier.

8. The method of claim 1, wherein at least one of the following applies:
Min_type_1 comprises a first number of the first type of cells on a serving radio access technology and a second number of the first type of cells on a non-serving radio access technology; and
Min_type_2 comprises a first number of the second type of cells on the serving radio access technology and a second number of the second type of cells on the non-serving radio access technology.

9. The method of claim 1, wherein Min_type_2 is determined based on a periodicity (Tp) with which a discovery reference signal (DRS) burst is transmitted in a reference signal configuration of the second type of cells.

10. The method of claim 1, wherein Min_type_2 is determined based on the length of a discovery reference signal (DRS) burst in the second type of cells.

11. The method of claim 1, wherein Min_type_2 is determined based on one or any combination of the following: periodicity of a discovery reference signal (DRS) burst, a length of the DRS burst, signal quality, location, number of the second type of cells relative to number of the first type of cells in proximity to the wireless device, a DRS type, and a priority factor.

12. The method of claim 1, wherein the radio task corresponds to at least one of:
reporting radio measurements to the network node;
determining a position of the wireless device; and
performing a cell change.

13. A method in a network node, comprising:
determining one or more pre-defined rules or criteria to be used by a wireless device for adapting a minimum number (Min_type_1) of a first type of cells, and a minimum number (Min_type_2) of a second type of cells, for which radio measurements are to be performed by the wireless device during an at least partly overlapping measurement time (T0) comprising a plurality of subframes, wherein:
the first type of cell transmits at least one type of reference signal in every subframe comprising T0, and
the second type of cell transmits at least one type of reference signal in one or more subframes comprising T0 but does not transmit any type of reference signal in at least one other subframe comprising T0; and
sending the determined one or more pre-defined rules or criteria to the wireless device for use in performing radio measurements on reference signals received during T0.

14. The method of claim 13, wherein the one or more pre-defined rules or criteria to be used by the wireless device are determined based on one or any combination of the following conditions or scenarios: cell load, interference in cell, and speed of the wireless device.

15. The method of claim 13, further comprising:
receiving a measurement report from the wireless device, the measurement report including radio measurements made during T0 for at least Min_type_1 of the first type of cells and at least Min_type_2 of the second type of cells; and
using the measurement report received from the wireless device to perform one or more radio tasks.

16. The method of claim 13, wherein the sum of Min_type_1 plus Min_type_2 is less than or equal to a minimum number (M_total) of cells that are in total to be measured by the wireless device during T0.

17. The method of claim 13, wherein at least one of the following applies:
Min_type_1 comprises a first number of the first type of cells on a serving carrier and a second number of the first type of cells on a non-serving carrier; and
Min_type_2 comprises a first number of the second type of cells on the serving carrier and a second number of the second type of cells on the non-serving carrier.

18. The method of claim 13, wherein at least one of the following applies:
Min_type_1 comprises a first number of the first type of cells on a serving radio access technology and a second number of the first type of cells on a non-serving radio access technology; and
Min_type_2 comprises a first number of the second type of cells on the serving radio access technology and a second number of the second type of cells on the non-serving radio access technology.

19. The method of claim 13, wherein the pre-defined rules or criteria cause the wireless device to determine Min_type_2 based on a periodicity (Tp) with which a discovery reference signal (DRS) burst is transmitted in a reference signal configuration of the second type of cells.

20. The method of claim 13, wherein the pre-defined rules or criteria cause the wireless device to determine Min_type_2 based on a length of a discovery reference signal (DRS) burst in the second type of cells.

21. The method of claim 13, wherein the pre-defined rules or criteria cause the wireless device to determine Min_type_2 based on one or any combination of the following: periodicity of a discovery reference signal (DRS) burst, a length of the DRS burst, signal quality, location, number of the second type of cells relative to number of the first type of cells in proximity to the wireless device, a DRS type, and a priority factor.

22. The method of claim 13, wherein the radio task corresponds to at least one of:
re-configuring discovery reference signal (DRS) parameters of the network node;
signaling to a neighboring cell of the second type to adjust DRS parameters used for the neighboring cell; and
performing a cell change.

23. A wireless device comprising a processor and a memory, wherein said memory contains instructions executable by said processor whereby wireless device is configured to:
adapt, based on one or more pre-defined rules or criteria, a minimum number (Min_type_1) of a first type of cells, and a minimum number (Min_type_2) of a second type of cells, for which the wireless device is to perform radio measurements during an at least partly overlapping measurement time (T0) comprising a plurality of subframes, wherein:
the first type of cell transmits at least one type of reference signal in every subframe comprising T0, and
the second type of cell transmits at least one type of reference signal in one or more subframes comprising T0 but does not transmit any type of reference signal in at least one other subframe comprising T0;
perform the radio measurements on reference signals received during T0 from at least Min_type_1 of the first type of cells and at least Min_type_2 of the second type of cells; and
use the radio measurements for one or more radio tasks.

24. The wireless device of claim 23, wherein at least one of the pre-defined rules or criteria for adapting at least one of Min_type_1 and Min_type_2 is received from the network node.

25. The wireless device of claim 23, wherein at least one of the pre-defined rules or criteria for adapting at least one of Min_type_1 and Min_type_2 is retrieved from memory of the wireless device.

26. The wireless device of claim 23, wherein the sum of Min_type_1plus Min_type_2 is less than or equal to a minimum number (M_total) of cells that are in total to be measured by the wireless device during T0.

27. The wireless device of claim 23, wherein at least one of Min_type_1 and Min_type_2 is received from the network node.

28. The wireless device of claim 23, wherein at least one of Min_type_1 and Min_type_2 is determined by the wireless device autonomously.

29. The wireless device of claim 23, wherein at least one of the following applies:
   Min_type_1 comprises a first number of the first type of cells on a serving carrier and a second number of the first type of cells on a non-serving carrier; and
   Min_type_2 comprises a first number of the second type of cells on the serving carrier and a second number of the second type of cells on the non-serving carrier.

30. The wireless device of claim 23, wherein at least one of the following applies:
   Min_type_1 comprises a first number of the first type of cells on a serving radio access technology and a second number of the first type of cells on a non-serving radio access technology; and
   Min_type_2 comprises a first number of the second type of cells on the serving radio access technology and a second number of the second type of cells on the non-serving radio access technology.

31. The wireless device of claim 23, wherein Min_type_2 is determined based on a periodicity (Tp) with which a discovery reference signal (DRS) burst is transmitted in a reference signal configuration of the second type of cells.

32. The wireless device of claim 23, wherein Min_type_2 is determined based on the length of a discovery reference signal (DRS) burst in the second type of cells.

33. The wireless device of claim 23, wherein Min_type_2 is determined based on one or any combination of the following: periodicity of a DRS burst, length of the DRS burst, signal quality, location, number of the second type of cells relative to number of the first type of cells in proximity to the wireless device, a DRS type, and a priority factor.

34. The wireless device of claim 23, wherein the radio task corresponds to at least one of:
   reporting radio measurements to the network node;
   determining a position of the wireless device; and
   performing a cell change.

35. A network node comprising a processor and a memory, wherein said memory contains instructions executable by said processor whereby the network node is configured to:
   determine one or more pre-defined rules or criteria to be used by a wireless device for adapting a minimum number of a first type of cells, Min_type_1, and a minimum number of a second type of cells, Min_type_2, for which the wireless device is to perform radio measurements during an at least partly overlapping measurement time, T0, comprising a plurality of subframes, wherein:
      the first type of cell transmits at least one type of reference signal in every subframe comprising T0, and
      the second type of cell transmits at least one type of reference signal in one or more subframes comprising T0 but does not transmit any type of reference signal in at least one other subframe comprising T0; and
   send the determined one or more pre-defined rules or criteria to the wireless device for use in performing radio measurements on reference signals received during T0.

36. The network node of claim 35, wherein the one or more pre-defined rules or criteria to be used by the wireless device are determined based on one or any combination of the following conditions or scenarios: cell load, interference in cell, and a speed of the wireless device.

37. The network node of claim 35, wherein the network node is further configured to:
   receive a measurement report from the wireless device, the measurement report including radio measurements made during T0, for at least Min_type_1 of the first type of cells and for at least Min_type_2 of the second type of cells; and
   use the measurement report received from the wireless device to perform one or more radio tasks.

38. The network node of claim 35, wherein the sum of Min_type_1 plus Min_type_2 is less than or equal to a minimum number (M_total) of cells that are in total to be measured by the wireless device during T0.

39. The network node of claim 35, wherein at least one of the following applies:
   Min_type_1 comprises a first number of the first type of cells on a serving carrier and a second number of the first type of cells on a non-serving carrier; and
   Min_type_2 comprises a first number of the second type of cells on the serving carrier and a second number of the second type of cells on the non-serving carrier.

40. The network node of claim 35, wherein at least one of the following applies:
   Min_type_1 comprises a first number of the first type of cells on a serving radio access technology and a second number of the first type of cells on a non-serving radio access technology; and
   Min_type_2 comprises a first number of the second type of cells on the serving radio access technology and a second number of the second type of cells on the non-serving radio access technology.

41. The network node of claim 35, wherein the pre-defined rules or criteria cause the wireless device to determine Min_type_2 based on a periodicity (Tp) with which a discovery reference signal (DRS) burst is transmitted in a reference signal configuration of the second type of cells.

42. The network node of claim 35, wherein the pre-defined rules or criteria cause the wireless device to determine Min_type_2 based on a length of a discovery reference signal (DRS) burst in the second type of cells.

43. The network node of claim 35, wherein the pre-defined rules or criteria cause the wireless device to determine Min_type_2 based on one or any combination of the following: periodicity of a DRS burst, length of the DRS burst, signal quality, location, number of the second type of cells relative to number of the first type of cells in proximity to the wireless device, a DRS type, and a priority factor.

44. The network node of claim 35, wherein the radio task corresponds to at least one of:
   re-configuring discovery reference signal (DRS) parameters of the network node;
   signaling to a neighboring cell of the second type to adjust DRS parameters used for the neighboring cell; and
   performing a cell change.

45. A non-transitory computer-readable medium storing a computer program comprising program instructions that, when executed by a processor of a wireless device, configure the wireless device to:
   adapt, based on one or more pre-defined rules or criteria, a minimum number (Min_type_1) of a first type of cells, and a minimum number (Min_type_2) of a second type of cells, for which the wireless device is to perform radio measurements during an at least partly overlapping measurement time (T0) comprising a plurality of subframes, wherein:

the first type of cell transmits at least one type of reference signal in every subframe comprising T0, and the second type of cell transmits at least one type of reference signal in one or more subframes comprising T0 but does not transmit any type of reference signal in at least one other subframe comprising T0;

perform the radio measurements on reference signals received during T0 from at least Min_type_1 of the first type of cells and at least Min_type_2 of the second type of cells; and use the radio measurements for one or more radio tasks.

46. A non-transitory computer-readable medium storing a computer program comprising program instructions that, when executed by a processor of a network node, configure the network node to:

determine one or more pre-defined rules or criteria to be used by a wireless device for adapting a minimum number (Min_type_1) of a first type of cells and a minimum number (Min_type_2) of a second type of cells, for which the wireless device is to perform radio measurements during an at least partly overlapping measurement time (T0) comprising a plurality of subframes, wherein:

the first type of cell transmits at least one type of reference signal in every subframe comprising T0, and the second type of cell transmits at least one type of reference signal in one or more subframes comprising T0 but does not transmit any type of reference signal in at least one other subframe comprising T0; and send the determined one or more pre-defined rules or criteria to the wireless device for use in performing radio measurements on reference signals received during T0.

* * * * *